J. W. MASTER & N. S. ABRAHAMSON.
REVERSIBLE TRACTION REEL.
APPLICATION FILED FEB. 20, 1911.
1,009,163.
Patented Nov. 21, 1911.
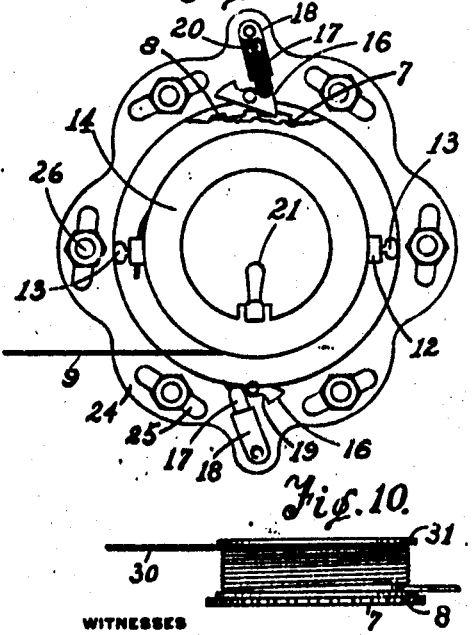
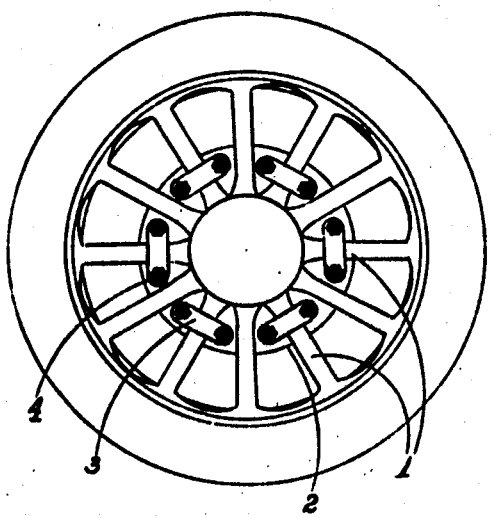
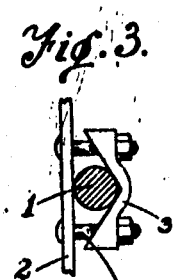
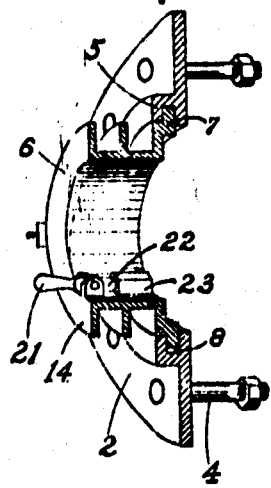
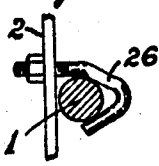
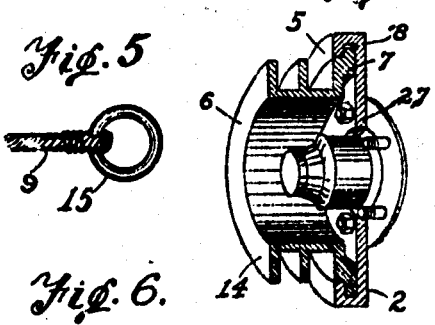
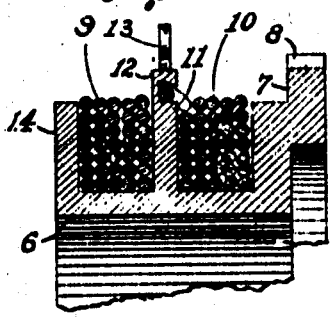
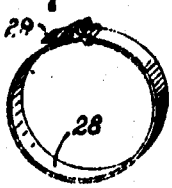
WITNESSES
F. M. Keeney.
N. S. Palmé
INVENTORS
James W. Master
N. S. Abrahamson

UNITED STATES PATENT OFFICE.

JAMES W. MASTER AND NILS S. ABRAHAMSON, OF SAN DIEGO, CALIFORNIA.

REVERSIBLE TRACTION-REEL.

1,009,163.   Specification of Letters Patent.   Patented Nov. 21, 1911.

Application filed February 20, 1911. Serial No. 609,837.

*To all whom it may concern:*

Be it known that we, JAMES W. MASTER and NILS S. ABRAHAMSON, citizens of the United States, residing at San Diego, in the county of San Diego and State of California, have invented a new and useful Improvement in Reversible Traction-Reels, of which the following is a specification.

This invention relates to a reversible traction reel for automobiles and vehicles of like character, having for its purposes the provision of means for increasing the traction of such vehicles when hindered or prevented from proceeding, by the stickiness and tenacity of mud.

It is more particularly a reel, revolubly supported upon a clamping plate, and provided with reversible ratchets, and two wire cables oppositely wound thereon, whereby either wire cable may be rapidly unwound for the purpose of securing to some fixed support, and the vehicle withdrawn from the mud by the application of power to the axle thereof, the ratchets holding the reel while the vehicle is withdrawn from the mud by the re-winding of the cable.

These and other objects and advantages are attained by the device embodying the principles of this invention, and comprising the combination and arrangement of parts, substantially as herein described and claimed, and illustrated in the accompanying drawings forming a part of this specification, and in which:

Figure 1 represents a side elevation of an automobile wheel having the reversible reel attached thereto, and shows in detail the clamps on the inner side of the spokes. Fig. 2 is a side view of a modified form of the device, showing in detail the reversible ratchet acting upon the toothed rim of the reel. Fig. 3 is a detail view of the method of clamping to a wheel, the spoke being shown in cross-section. Fig. 4 is a detail view of a method of clamping to a wheel, comprising a hook with the nut on the outer face of the plate. Fig. 5 is a detail view of the end of a wire cable showing a ring attached thereto, which may be used with an iron pin not shown in the drawings, or may be attached to any convenient point or projection. Fig. 6 is a sectional detail view of a portion of the reel showing method of securing the cable when not in use. Fig. 7 is a sectional detail view of the reel and clamping plate, showing the manner in which the plate holds the reel. Fig. 8 is a sectional detail view of a modified form of the invention showing the manner of attaching the device rigidly to the hub of a wheel of the character described. Fig. 9 represents a cover for the reel. Fig. 10 represents a modified form of the reel adapted to be used with one cable. The cable used on this reel will be wound in one layer permitting either end to be drawn out as and for the purpose desired, the opposite end of the cable being secured to the reel.

Referring more particularly to the drawings in which similar characters of reference designate corresponding parts throughout the several views, numeral 1 designates the spokes of an automobile wheel having clamping plate 2, mounted thereon and held in position by straps 3, each strap being placed on the inner side of a spoke and secured to a pair of bolts 4, extending from the clamping plate through to the inner side of the wheel.

An annular flange 5, holds reel 6, in a revoluble position upon clamping plate 2; the reel being provided with a flange 7, having ratchet teeth 8, thereon. A cable 9, is wound upon the reel in one direction, and cable 10, in the opposite direction, the reel having an annular partition 11, dividing the same into two sections whereby the cables which are preferably made of twisted wire strands, may be each unwound without interfering with the other. A clamp 12, provided with a thumb-screw 13, is formed upon the outer edge of partition 11; and also upon the rim of flange 14, of the reel, whereby the free ends of the cable may be secured while not in use. The cable ends are provided with a loop or ring 15, which may be slipped over an iron pin which has been driven into the ground or onto any convenient projection, when the device is to be used for traction purposes.

Reversible dogs 16, are adapted to engage with ratchet teeth 8, in either direction, being held in engagement therewith by a spring-pressed hollow plunger 17, slidably mounted in a pivoted socket 18; the round nose of the plunger engaging with a corresponding depression 19, formed on each end of the reversible dogs. Spring 20, bears against the inner end of the hollow plunger and the inner end of the socket, thereby operating the plunger as described. A folding handle 21, is provided whereby the cable may be quickly rewound upon the reel, a spring-pressed, flat-nosed plunger 22, slidably mounted in a fixed socket 23, and bearing upon corresponding flat surfaces on the handle, thereby holding the same in an extended position as in Fig. 7, or a folded position as in Fig. 2.

The clamping plate 2, as described and illustrated in Figs. 1 and 7, is detachable, and may be applied to spokes of various sizes and of different design in cross-section.

A modification of a detachable clamping plate is shown in Fig. 2, the plate 24, being provided with slots 25, through which hooks 26, pass, and the nuts turned thereon upon the outer side of the vehicle wheel. The slots permit the device to be applied to wheels having different numbers of spokes, and the hooks are so shaped that they will bind equally well on spokes of various sizes and of different design in cross-section.

In Fig. 8 is shown a further modification of the clamping plate, the same being provided with an annular flange 27, extending inward toward the hub of the wheel and adapted to be bolted rigidly to the flange as is usually found in automobile wheels and vehicles of like character.

In operation, the device is used for traction purposes in the following manner. The vehicle wheel being hindered in tractive power by mud whereby the progress of the vehicle is stopped, the ratchet dogs may be set by pushing the pivoted socket containing the plunger into either position, and a cable may be quickly drawn out and the end thereof secured to some solid support. The dogs may then be quickly re-set for rewinding the cable on the reel, and power applied to the axle to rotate the vehicle wheel, which will operate to pull the vehicle backward or forward in accordance with the direction of the point at which the cable is supported. Should no convenient support be found to which the cable may be attached, an iron pin may be driven into the ground for such purpose. After the vehicle is loosened from the mud, handle 21, may be used for rewinding.

It is to be understood that this device is to be used when the vehicle is prevented from progressing by the action of the mud, the power wheel of the vehicle being capable of rotation but not having traction enough to move the vehicle in the mud, and as this frequently occurs with motor-power vehicles on a muddy road, this invention will be a small, compact, light, and useful device for the purpose as described.

The cover as shown in Fig. 9, consists of a thin metal band 28, one end of which is pivoted to the end of lever 29, and the opposite end of the band is pivotally connected to the lever a short distance from the end, the turning of lever 29 into the position as shown in the drawing, acting to bind the band on the reel.

A further modification of the invention is shown in Fig. 10, in which cable 30, is wound in one layer on reel 31, thus permitting the use of either end of the cable to be drawn out in either direction for the purpose required, the opposite end of the cable being secured to the reel.

From the foregoing description it will be seen that simple and efficient means are herein provided for accomplishing the objects of the invention, but, while the elements shown and described are well adapted to serve the purposes for which they are intended it is to be understood that the invention is not limited to the precise construction as set forth but includes such changes as may fall within the scope of the appended claims, and such changes as may be made without departing from the spirit of the invention.

We claim as our invention:

1. In a device as described, a clamping plate adapted to be clamped to a vehicle wheel, a reel revolubly mounted on the clamping plate, a toothed flange on the reel, dogs pivoted to the clamping plate and engaging with the toothed flange of the reel, a partition dividing the reel into two sections, and a cable carried in each section, the cables being oppositely wound on the reel whereby the cable may be quickly drawn out in either direction for utilizing the traction power produced, to move the vehicle in either direction, substantially as shown.

2. In a device as described, a clamping plate adapted to be clamped to a vehicle wheel, a reel revolubly mounted thereon, a toothed flange on the reel, and reversible dogs pivoted to the clamping plate and engaging with the toothed flange of the reel, forming a ratchet therefor, substantially as shown.

3. In a device as described, a clamping plate adapted to be secured to a vehicle wheel, a reel revolubly mounted thereon, and a reversible ratchet mechanism mounted on the clamping plate and adapted to control the rotation of the reel, comprising double-ended dogs pivoted to the clamping plate, sockets also pivoted to the clamping plate, a hollow, round-nosed plunger slidably mounted in each socket, and a spring within the hollow plunger interposed between the inner end thereof and the inner end of the socket, normally holding the round nose of the plunger against a correspondingly shaped depression on the back of the dog, whereby the same is made to engage with the toothed flange of the reel, substantially as shown.

4. In a device as described, a reel revolubly mounted on a vehicle wheel, means for controlling the rotation of the reel in either direction, and a folding handle attached to the reel whereby the same may be quickly wound up in either direction, substantially as shown.

5. In a device as described, a reel revolubly mounted on a vehicle wheel, a cable wound thereon, and a cover adapted to incase and protect the reel and cable from dirt and injury, comprising a thin metallic band which may be placed over the reel, and means for tightening the same whereby it may hold to the reel, substantially as shown.

6. In a reversible traction reel, a reel, a cable wound thereon, a clamping plate on which the reel is revolubly mounted, reversible dogs for preventing the rotation of the reel independently of the clamping plate or for controlling the rotation of the reel in either direction, the said dogs being pivoted to the clamping plate, and an inner annular flange extending toward the hub and having a series of holes arranged in the inner rim at convenient intervals for securing the clamping plate to the hub of a vehicle wheel, the clamping plate being thereby adapted to be rigidly attached to said vehicle wheel, whereby the reel and cable carried thereby may coöperate with the power-driven wheel for tractive purposes, substantially as set forth.

In testimony whereof we have hereunto affixed our signatures this eighth day of February, nineteen hundred and eleven.

JAMES W. MASTER.
NILS S. ABRAHAMSON.

In the presence of—
F. M. KEENEY,
N. S. PALMÉ.